United States Patent [19]

Hayashi et al.

[11] Patent Number: 5,826,033
[45] Date of Patent: Oct. 20, 1998

[54] PARALLEL COMPUTER APPARATUS AND METHOD FOR PERFORMING ALL-TO-ALL COMMUNICATIONS AMONG PROCESSING ELEMENTS

[75] Inventors: Kenichi Hayashi; Takeshi Horie, both of Kawasaki, Japan

[73] Assignee: Fujitsu Limited, Kawasaki, Japan

[21] Appl. No.: 982,579

[22] Filed: Nov. 27, 1992

[30] Foreign Application Priority Data

Nov. 26, 1991 [JP] Japan ................................ 3-310605

[51] Int. Cl.⁶ ................................................ H04L 12/407
[52] U.S. Cl. ............................ 395/200.68; 395/200.73; 395/800.12
[58] Field of Search ..................... 395/800.12, 200.73, 395/550, 200, 800, 200.1, 200.68, 200.72; 375/38; 370/94.1

[56] References Cited

U.S. PATENT DOCUMENTS

| | | | |
|---|---|---|---|
| 4,645,874 | 2/1987 | Fildes ........................................ | 379/93 |
| 4,933,933 | 6/1990 | Dally et al. ............................... | 370/406 |
| 5,008,882 | 4/1991 | Peterson et al. ......................... | 370/406 |
| 5,099,496 | 3/1992 | Pope et al. ................................ | 375/15 |
| 5,105,424 | 4/1992 | Flaig et al. ............................... | 370/94.1 |
| 5,157,692 | 10/1992 | Horie et al. ............................... | 375/38 |
| 5,163,176 | 11/1992 | Flumerfelt et al. ....................... | 342/174 |
| 5,218,676 | 6/1993 | Ben-Ayed et al. ....................... | 395/200 |
| 5,228,138 | 7/1993 | Pratt et al. ................................ | 395/550 |
| 5,278,975 | 1/1994 | Ishihata et al. ........................... | 395/550 |

OTHER PUBLICATIONS

Proceedings Supercomputing 88, 14, Nov. 1988, Orlando, USA, pp. 42–47, Pittelli, 'Analysis of a 3D Toroidal Network for a Shared Memory Architecture'.

Sixth Annual International Phoenix Conference on Computers and Communications, 25 Feb. 1987, Scottsdale, USA, pp. 14–17, Midkiff, 'Architectural Support for Interprocessor Communication in Point–to Point Multiprocessor Networks'.

Computer Architecture News, vol. 19, No. 1, Mar. 1991, New York, U.S., pp. 69–78, Herbordt, 'Message–passing Algorithms for SIMD Torus with Coteries'.

Proceedings Supercomputing 89, 13 Nov. 1989, Reno, USA, pp. 436–445, Gross, 'Communication in iWarp Systems'.

Linder et al., "An Adaptive and Fault Tolerant Wormhole Routing Strategy for k–ary n–cubes", IEEE Transactions on computers, vol. 40, No. 1, Jan. 1991, pp. 2–12.

*Primary Examiner*—Larry D. Donaghue
*Assistant Examiner*—John Hollansbee
*Attorney, Agent, or Firm*—Staas & Halsey

[57] ABSTRACT

A parallel computer and all-to-all communications method. A plurality of processors are connected in an n-dimensional torus network, to provide an optimum communication method and apparatus for completing all-to-all communications within a shortest possible time. In the parallel computer having an n-dimensional rectangular parallelopiped torus network having $a_1 \times a_2 \times \ldots \times a_n$ processors, with the maximum value of $a_1, a_2, \ldots, a_n$ defined as $a_{max}$, it comprises a phase control unit having a phase control table for storing information according to which destination processors are determined for each of the predetermined transmission phases of $a_{max} P/4$ (where P indicates the total number of processors) for a one-directional inter-processor connection channel, and of $a_{max} P/8$ for a two-directional inter-processor connection channel, and a message transmission unit for transmitting a message to a destination processor listed in the phase control table during the phase in which the present processor is a source processor according to the predetermined phase order.

7 Claims, 15 Drawing Sheets

|  | PE 1 | PE 2 | PE 3 | PE 4 | PE 5 | PE 6 | PE 7 | PE 8 |
|---|---|---|---|---|---|---|---|---|
| PHASE 1 | PE 2 | PE 5 | | | PE 6 | PE 1 | | |
| PHASE 2 | | PE 3 | PE 6 | | | PE 7 | PE 2 | |
| PHASE 3 | | | PE 4 | PE 7 | | | PE 8 | PE 3 |
| PHASE 4 | PE 4 | | | PE 5 | PE 8 | | | PE 1 |
| PHASE 5 | PE 6 | PE 1 | | | PE 2 | PE 5 | | |
| PHASE 6 | | PE 8 | PE 2 | | | PE 3 | PE 6 | |
| ⋮ | ⋮ | ⋮ | ⋮ | ⋮ | ⋮ | ⋮ | ⋮ | ⋮ |
| PHASE 15 | PE 1 | | PE 7 | | PE 5 | | PE 3 | |
| PHASE 16 | | PE 2 | | PE 8 | | PE 6 | | PE 4 |

PARALLEL COMPUTER APPARATUS AND METHOD FOR PERFORMING ALL-TO-ALL COMMUNICATIONS AMONG PROCESSING ELEMENTS

BACKGROUND OF THE INVENTION

1. Field of the Invention

This invention pertains to a parallel computer system in which a plurality of processor elements are connected in an n-dimensional torus network, and more specifically to a parallel computer system capable of optimally realizing all-to-all communications among processor elements.

2. Description of the Related Art

Communications performance affects greatly the applications of a parallel computer connected in a network e.g. of a hypercube, torus or mesh type. Therefore, there is a requirement to realize a communications algorithm capable of taking advantage of the network features to the fullest extent. Among the communications patterns frequently used in a large number of applications, all-to-all communications in which all processor elements transmit different messages to respective processor elements require the largest amount of communications transmission volume. The all-to-all communications are frequently used in a large number of applications such as a matrix transportation, and a two-dimensional FFT (fast Fourier Transform) or ADI. An art for expediting all-to-all communications is sought.

FIGS. 1A and 1B illustrate conventional all-to-all communications.

FIG. 1A shows an example of a two-dimensional torus network, in which each PE represents a processor element having a CPU. A torus network has a torus connection in which a mesh network has its end point connected to the other end point. Its structure enables a performance twice that of a mesh network to be realized.

All-to-all communications, which is an object of this invention, are such that all processor elements PEs transmit respective messages to all other respective destination processor elements. Although optimal all-to-all communications algorithms based on a wormhole routing or a channel connection system on a hypercube network and a mesh network are conventionally known, no optimal all-to-all communications algorithm for a torus network has been known.

Hence, all-to-all communications have been conducted, irrespective of the operation of other processor elements, to each receiving one of the processor elements PEs, as shown in FIG. 1B.

In an example shown in FIG. 1B, a processor element PE transmits a message first to its immediately right processor element PE in the same row, second to its next right processor element PE in the same row, in the same row, . . . , until the transmission of the message to all processor elements PEs in the same row has been complete, and then to the processor element PE immediately below in the next row. Further, the processor element PE in the next row transmits the message to its immediately right processor element PE, . . . and so forth. These procedures are repeated, until the message is transmitted sequentially to all processor elements PEs.

Typical routing systems for a torus network include a channel connection system for transmitting a message by initially securing a communications path from a message originator to a message terminator, and a wormhole routing system for extending sequentially to a message terminator by transmitting a message along a communications path to an immediate neighbor.

However, conventional all-to-all communications based on such a channel connection system or a wormhole routing system have a problem due to their inability to efficiently complete all-to-all communications in a short amount of time. Additionally, because a procedure for all-to-all communications has not been established, the procedure must be created for each application program, which causes a problem of having to incur a large development cost.

SUMMARY OF THE INVENTION

This invention aims at solving the above problems and providing a means for realizing optimal all-to-all communications on a torus network. This invention can be applied to a one-dimensional torus network as well as to any integer-dimensional torus network. Also, it is applicable not only to a square network but also to a rectangular network. In addition, this invention provides optimal systems for both uni-directional and bi-directional connecting channels.

A feature of the present invention resides in a parallel computer having n-dimensional torus network comprising $a_1 \times a_2 \times \ldots \times a_n$ processors for performing communications among processors through the torus network, each of the processors comprising phase control unit having a phase control table containing data pointing to source and destination processors for a predetermined number of transmission phases depending on the structure of the torus network and the number of the processors, and message sending unit for sending a message to a destination processor designated by the information stored in the phase control table in the phase control unit in a phase when the present processor works as a source processor according to a predetermined order among transmission phases.

DESCRIPTION OF THE PREFERRED EMBODIMENTS

Before describing an embodiment of this invention, the theoretical background of this invention is explained first.
[Model]

The communications model of this invention is described. A processor element is assumed to be capable of transmitting a message and receiving another concurrently. The [2] models are discussed, in which communications channels are bi-directional (transmittable in both directions simultaneously) and uni-directional (transmittable in a single direction only at one time). When an algorithm for a bi-directional channel is realized on a network having a uni-directional channel, the processing is ideally reduced to half. A channel connection system or a wormhole routing system is assumed.
[Theoretical Lower Limit on Number of Transmission/Reception Phases]

Here, the theoretical lower limit on the number of transmission/reception phases in all-to-all communications is obtained. Assuming that the distances between neighboring processor elements are all one [1], the moving distance of a message from a message originating processor element to a message terminating processor element can be expressed by the number of processor elements. The number of communications paths necessary for all-to-all communications is obtained by multiplying the average D of the moving distance by the number of processor elements P and the number of messages S transmitted from each processor element.

The number of transmission/reception phases L when communications paths have equal communications loads is obtained by dividing the above value by the sum total of communications paths N (which is calculated by counting a uni-directional communications path between neighboring processor elements as one [1] and a bi-directional communications path between neighboring processor elements as two [2]). That is, $$L = DPS/N$$

If there is a processor element capable of transmission/reception with phases less than the value, because there must be a processor element requiring transmission/reception with phases greater than this value, all processor elements cannot consummate all-to-all communications with phases less than this value. That is, this value becomes the theoretical lower limit on the number of phases required for all-to-all communications.
[Theoretical Lower Limit on One-Dimensional Torus]

Based on the above discussion, the lower limit on the phases for all-to-all communications in a one-dimensional torus is obtained. Assuming that the number of processor element is a, the average moving distance of a message is a/4 when a is even, or $(a^1-1)4a$ when a is odd.

Figure 2:
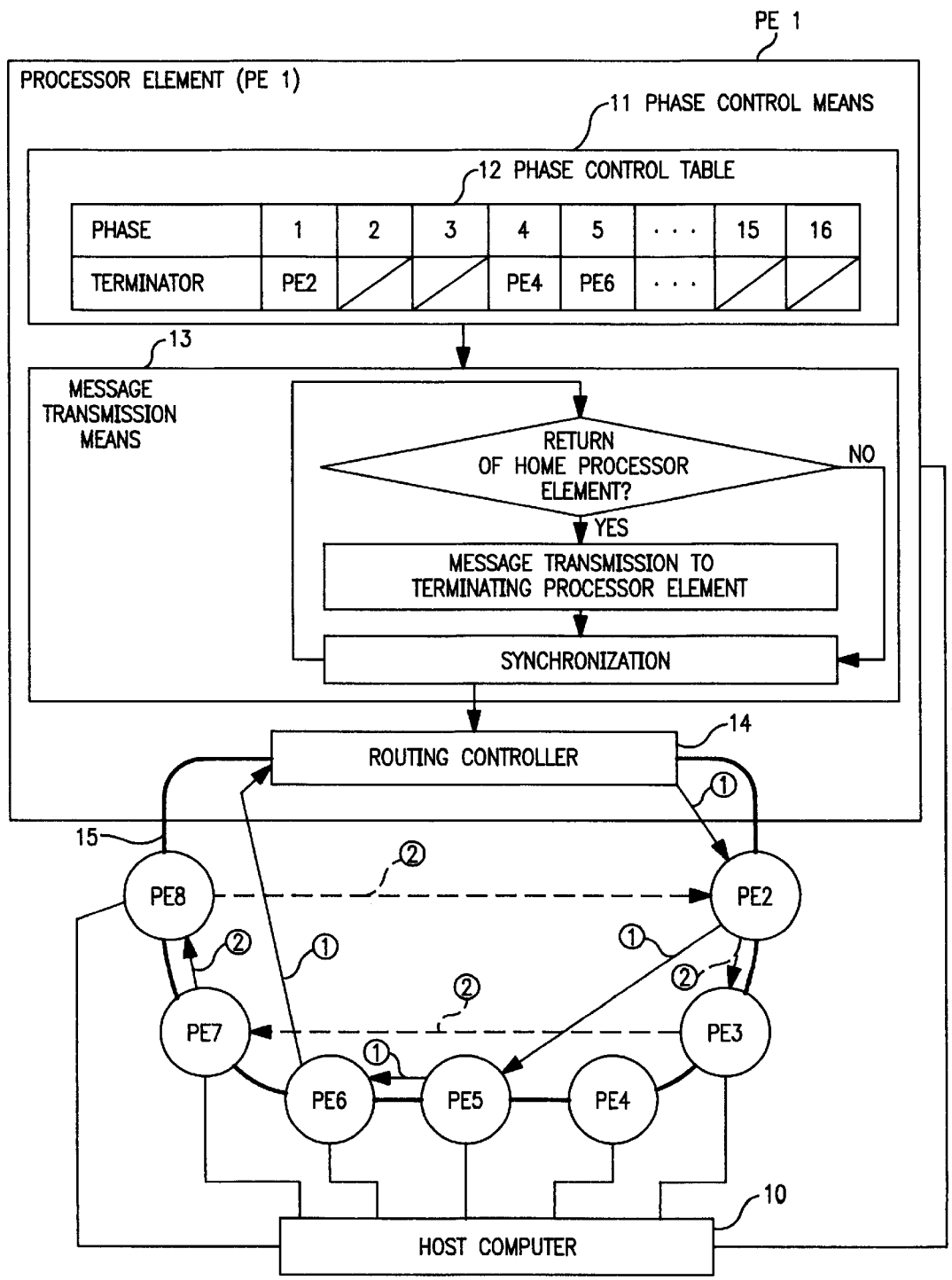
FIG. 2 is a block diagram of this invention.

FIG. 2 is a block diagram of this invention.

In FIG. 2, PE1 through PE8 are processor elements composing a parallel computer, 10 is the host computer of the entire parallel computer system, 11 is a phase control means, 12 is a phase control table, 13 is a message transmission process means, 14 is a routing controller for controlling a routing in a torus network, and 15 is a torus network.

According to the process performed by, for example, the host computer 10 of the parallel computer system, this invention causes a parallel computer to provide transmission/reception phases in a number predetermined by the number of processor elements and the structure of a torus network. For each transmission/reception phase, the phase control means 11 in the corresponding processor element stores and retains data on a predetermined message originating/terminating processor element. For instance, the phase control means 11 comprises a phase control table 12 for retaining data on a predetermined message terminating processor element in each phase and for performing a control on phasing.

The message transmission means 13 follows the sequence of predetermined phases in each processor element, and obtains data from the phase control table 12, and determines whether the home processor element is a message originating processor element in a current phase. If it is indeed a message originating processor element in the current phase, the message transmission means 13 transmits a message from the home processor element via the routing controller 14 to the message terminating processor elements in the current phase. A synchronization is established as necessary for phasing, and all-to-all communications consummate upon completion of all phases.

The all-to-all communications method of the present invention aims at realizing all-to-all communications for use in a parallel computer having an n-dimensional torus network in an a1×a2× . . . ×an rectangular parallelopiped by sequentially phasing or cycling amax P/4 predetermined transmission/reception phases and by transmitting a message to the message terminating processor element for the home processor element predetermined in each of the amax P/4 phases, where amax is defined as the maximum value of a1, a2, . . . , an determined by a structure of a torus network and P is defined as the total number of processor elements.

The all-to-all communications method of the present invention is such that, when a communications path is determined between a message originating processor element and a message terminating processor element each in the amaxP/4 phases, and when the number of processor elements ai in a single torus in an n-dimensional torus network is an even number larger than 7, the $a_i$ processor elements are split into two [2] groups each composed of neighboring ai/2 processor elements, and is such that an end processor element in a first group is made a first processor element, that a second processor element is selected from the remaining processor elements in a first group, that third and fourth processor elements are selected from a second group separated apart by ai/2 from the first and second processor elements, and that a communications path is formed as a four [4] point cycle by the first, second, third and fourth processor elements.

When the connection channel between processor elements are bi-directional, all-to-all communications are realized for use in a parallel computer having an n-dimensional torus network in an a1×a2× . . . ×an rectangular parallelopiped by sequentially phasing amax P/8 predetermined transmission/reception phases and by transmitting a message to the message terminating processor element for the home processor element predetermined in each of the amax P/8 phases.

To reduce the number of phases necessary for communications, the all-to-all communications method of the present invention realizes all-to-all communications by superposing two mutually independent phases in opposite communications directions in the amaxP/4 phases assumed when channels connecting processor elements are uni-directional, by predetermining a communications path in each of amaxP/8 phases, when channels connecting processor elements are bi-directional, and by using the phase.

When a torus network is more than two dimensional, the all-to-all communications method realizes all-to-all communications by combining communications paths in phases assumed when torus networks in respective dimensions are one-dimensional when a torus network is more than two dimensional, thereby determining a communications path in each phase, superimposing mutually independent communications paths, and thus using a reduced number of phases.

Assume here in the present invention that an interface between a processor element and a network has one [1[ port, and that each processor element can simultaneously transmit a message and receive another.

For instance, as shown in FIG. 2, a one-dimensional torus network 15 connecting a (which is eight [8] in this case) processor elements (PE1 through PE8) in a ring form has a theoretical lower limit on the number of transmission/reception phases, which is $a^2/4 (=64 \div 4=16)$ for all-to-all communications, when a connecting channel is uni-directional. This will be described later.

This invention is such that the data on message originating processor elements and message terminating processor element in sixteen [16] phases are arranged in advance according to the process performed by the host computer 10, and a phase control means 11 in each processor stores data on a message originating processor element and a message terminating processor element for each phase. A message transmission means 13 in processor element PE1 transmits data to processor element PE2 by referring to a phase control table 12 in a first phase of all-to-all communications.

At the same time, other processor elements similarly transmit respective messages to terminators determined in the first phase. This enables processor elements PE1, PE2, PE5 and PE6 to transmit messages respectively to processor elements PE2, PE5, PE6 and PE1, which are shown as (1).

In a second phase occurring next, processor element PE1 suspends its message transmission. This enables processor elements PE2, PE3, PE7 and PE8 transmit messages respectively to processor elements PE3, PE7, PE8 and PE2, which are shown as (2).

A similar repetition until the sixteenth phase concludes all-to-all communications in which all processor elements transmit respective messages to all other respective destination processor elements.

Figure 1A:
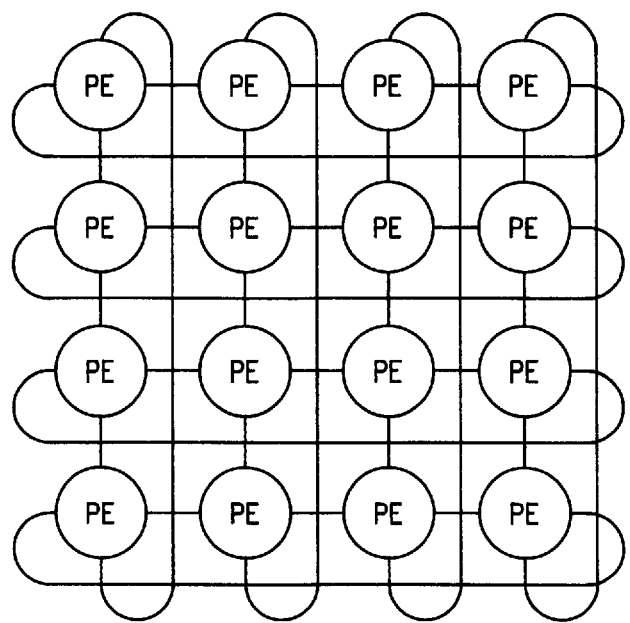
FIG. 1A illustrates a block diagram of a two-dimensional torus network for use in a conventional all-to-all communications.
Figure 1B:
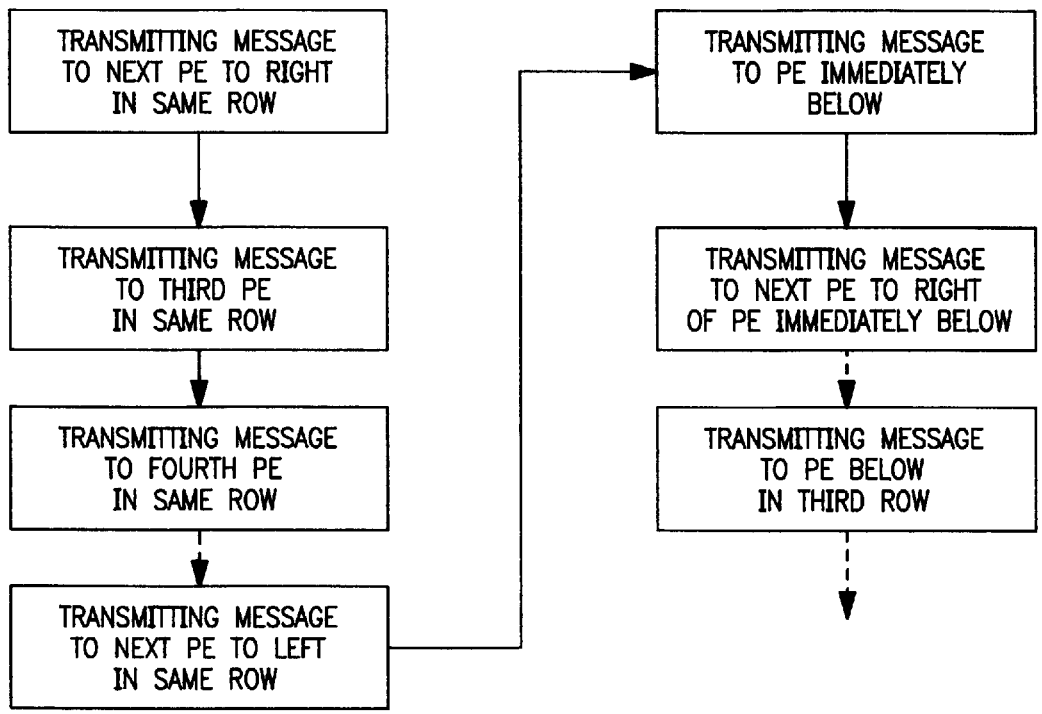
FIG. 1B illustrates a flowchart of conventional all-to-all communications.

A four-point cycle is formed in each phase, for optimizing the number of transmission/reception phases. That is, as in the example shown in FIG. 1, originators and terminators are set such that four [4] processor elements in one [1] torus become both originating and message terminating processor elements. This prevents both a channel connection system and a wormhole routing system from having interference in establishing communications paths.

Figure 4:
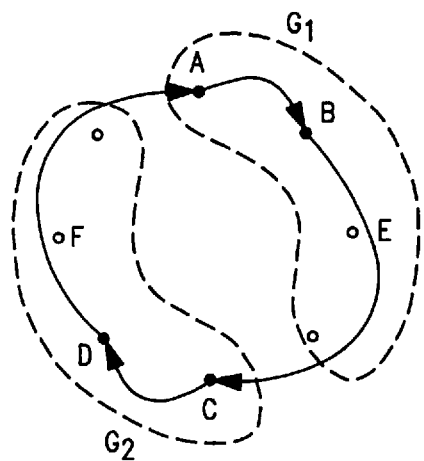
FIG. 4 is an example of a four-point cycle for use in explaining this invention.

As explained in detail by referring to FIG. 4, assuming that there are a processor elements, such as four-point cycle is formed by splitting the a processor elements into two [2] groups G1 and G2 each comprised of a/2 neighboring processor elements, and by selecting C and D from among G2 at positions distanced by a/2 respectively from A and B after designating a processor element at one [1] end of G1 as A and selecting B from among the remaining processor elements in G1.

FIG. 2 shows a case in which connection is by uni-directional channel. When a communications channel is a bi-directional channel capable of simultaneous transmissions in both directions, a theoretical lower limit of eight [8] phases is obtained by superimposing two [2] mutually independent four-point cycles having different communications directions, of the sixteen [16] phases in the case of an uni-directional channel (or channels).

For instance, a phase for a bi-directional channel (or channels) comprises the first phase for having processor elements PE1, PE2, PE5 and PE6 transmit their messages respectively to processor elements PE2, PE5, PE6 and PE1, the first phase including a four-point cycle, having an opposite communications direction, composed of processor elements PE3, PE4, PE7 and PE8, which are independent of processor elements PE1, PE2, PE5 and PE6.

That is, by designating the left and right sides of an arrow (→) as an originator and a terminator, a phase for a bi-directional channel comprises PE1→PE2→PE5→PE6→PE1 and PE3→PE8→PE7→PE4→PE3.

When the dimension of a torus network is not less than two [2], the communications paths are set as follows. First, the communications paths of a phase are set, by assuming that the dimension of the torus network is one [1]. By combining the communications paths in the number of dimensions n (n≧2), the communications paths of n-dimensional phases are set. By superimposing plural phases having mutually independent communications paths, final phase are determined. This optimizes the number of phases to the theoretical lower limit.

In this case, the contents of the phase management table 12 in the phase managing unit 11 in each processor are generated by the host computer 10. However, depending on the features of systems or applications, they can be generated by one processor and informs the other processors of the contents, or all processors can duplicately generate the contents.

Figure 3A:
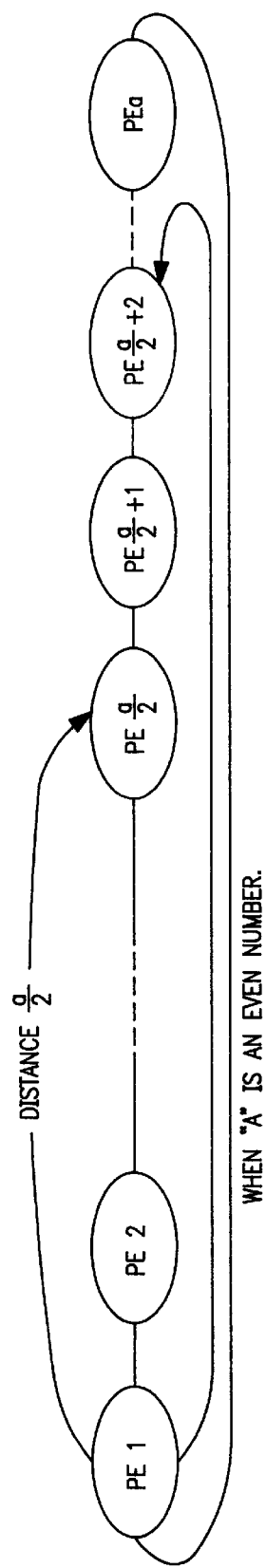
FIG. 3A is an explanatory view for the average value of message removal distances where the number of processor elements is an even number.
Figure 3B:
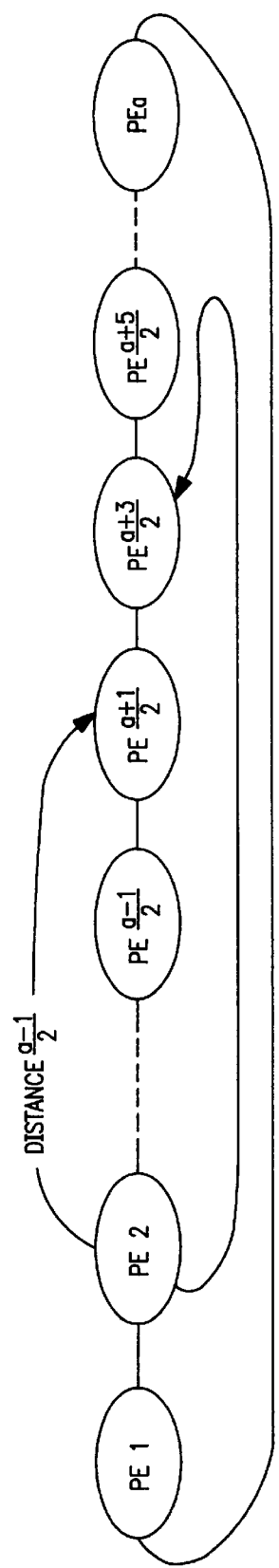
FIG. 3B is an explanatory view for the average value of message removal distances where the number of processor elements is an odd number.

FIGS. 3A and 3B are views for explaining how to calculate the average value of moving distances. In FIGS. 3A and 3B, there are two assumptions in calculating the average value of moving distances. A first assumption is that the shortest distance between processor elements including the opposite direction is determined to be the "distance between processor elements". A second assumption is that the average value is calculated with the transmissions to the sending processor itself included in the number of transmissions.

In FIG. 3A, the number of processor elements a is an even number. In this case, the distance between PE1 and PE a/2+1 shows the maximum number a/2 clockwise or counter clockwise around the torus network. The distance between PE1 and each of PE2 through PE a/2 can be shorter if a target processor is traced along the torus network clockwise from PE1. By contrast, the difference between PE1 and each of PE a/2+2 through PE a can be shorter if a target processor is traced along the torus network counterclockwise from PE1. Therefore, when messages are sent from PE1 to all processor elements including the sending processor itself, the average value of message moving distances can be calculated by the following equation, resulting in the value a/4 mentioned above.

$$\frac{a/2 + 2(a/2 - a) + 2(a/2 - 2) + \ldots + 2\{a/2 - (a/2 - 1)\}}{a}$$

In FIG. 3B, the number of processor elements a is an odd number. The moving distance is shorter when a message is transmitted clockwise along the torus network from PE1 to each of the processor elements up to PE a+1/2, and counterclockwise along the torus network from PE1 to each of the processor elements from PE a+3/2 to PEa, where the moving distance is a−1/2 in both directions. The moving distance is shorter when a message is transmitted clock wise along the torus network from PE2 to each of the processor elements up to PE a−1/2, and counterclockwise from PE2 to each of the processor elements from PE a+3/2 to PEa. Therefore, the average value of message moving distances can be calculated by the following equation, resulting in $(a^2-1)4a$.

$$\frac{2x(a-1)/2 + 2x(a-3)/2 + 2x(a-5)/2 + \ldots + 2x\{a-(a-2)\}/2}{a}$$

Using these moving distances d, the number of transmission phases L can be obtained. The sum total of communications paths N is a in the case of a uni-directional channel and 2a in the case of a bi-directional channel. Therefore, when a is even, the lower limit L1s in the case of using a uni-directional channel is $$L1s = (a \times a/4 \times a)/a = a^2/4$$

and the lower limit L1d in the case of using a bi-directional channel is $$L1d = (a \times a/4 \times a)/2a = a^2/8.$$

[Algorithm for Realizing the Lower Limit on One-Dimensional Torus]

An algorithm for realizing the lower limit is described below based on an example shown in FIG. 4. a is assumed to be an even number not less than eight [8]. Except for a special case described later, each phase becomes a uni-directional cycle connecting four [4] processor elements (A, B, C and D).

a processor elements are split into two [2] groups G1 and G2 each comprising a/2 neighboring processor elements. The processor element at one [1] end of G1 is designated as A, and a remaining one in G1 is designated as B. The ones in G2 distanced by a/2 respectively from A and B are designated as C and D.

To represent a phase (A→B→C→D→A), by separating the distances between four [4] points by colons, an expression $\alpha:\beta:\alpha:\beta$ is used, where $2(\alpha+\beta) = a$.

For instance, in the example shown in FIG. 4, this is 1:3:1:3.

If A is shifted by one [1] for phases represented by the same expression, all phase represented by the same expression can be selected without duplication.

Because they contain a phase $\beta:\alpha:\beta:\alpha$, when a is an integer multiple of four [4], the following a/4−1 cases need to be considered $$\begin{array}{ccccccc}
1 & : & a/2-1 & : & 1 & : & a/2-1 \\
2 & : & a/2-2 & : & 2 & : & a/2-2 \\
3 & : & a/2-3 & : & 3 & : & a/2-3 \\
\ldots & & \ldots & & \ldots & & \ldots \\
a/4-1 & : & a/4+1 & : & a/4-1 & : & a/4+1,
\end{array} \quad (1)$$

and, when a is not an integer multiple of four [4], the following (a−2)/4 cases need to be considered $$\begin{array}{ccccccc}
1 & : & a/2-1 & : & 1 & : & a/2-1 \\
2 & : & a/2-2 & : & 2 & : & a/2-2 \\
3 & : & a/2-3 & : & 3 & : & a/2-3 \\
\ldots & & \ldots & & \ldots & & \ldots \\
(a-2)/4 & : & (a+2)/4 & : & (a-2)/4 & : & (a+2)/4,
\end{array} \quad (2)$$

in which case, the phase has a cases.

When a is an integer multiple of four [4], in addition to the above, there is an expression represented by $$a/4 : a/4 : a/4 : a/4, \quad (3)$$

in which case, a phase has a/2 cases.

Although these expressions include all four-point cycles, they do not include communications phases, such as one shown in FIG. 4 between A and C, distanced by a/2. Thus two-point cycle is represented by the following expression.

$$a/4 : a/4 \quad (4)$$

in which the phase has a/2 cases. This case can be construed as a two-point cycle (A→C→A). Points E and F shown in FIG. 4 are considered as transmitting messages to themselves.

As such, when a is an integer multiple of four [4], by summing up the cases in (1), (3) and (4), the number of transmission/reception phases is $$a \times (a/4-1) + a/2 + a/2 = a^2/4,$$

and when a is not an integer multiple of four [4], by summing up the cases in (2) and (4), the number of transmission/reception phases is $$a \times (a-2)/4 + a/2 = a^2/4,$$

both of which are equal to the lower limit L1s in the case of using a uni-directional channel.

Figure 5:
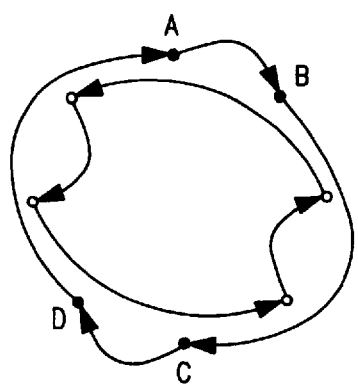
FIG. 5 is an explanatory chart for the superimpositions of two [2] phases for explaining this invention.

FIG. 5 is an explanatory chart for the superimposition of two [2] phases, for a bi-directional channel, obtained in the case of a uni-directional channel.

In the case of a bi-directional channel, a supervision of two cycles obtained in the uni-directional case, in opposing directions, realizing an optical phase. Here, because each processor element performs one-port communications, no single point of the four [4] points can be shared in selection. Also, because two [2] phases are selected such that each of their four [4] points do not overlap, a must be not less than eight [8].

In both cases (1) and (2) described earlier, when, of the phases represented by the same expression, cycles in opposite directions with an appropriate shift of A are selected, two [2] phases can be superimposed without sharing none of four [4] points in the cycles as shown in FIG. 5, and the expressions are reduced by half to a/2. When a is an integer multiple of four [4], phases of mutually opposing direction can be superimposed both in the cases of the above (3) and two-point cycles.

However, when a is not an integer multiple of four [4], since a/2, which is the number of phases of a two-point cycle, may be odd, not all two [2] phases can be superimposed together, and one [1] phase is left over.

Accordingly, when a is an integer multiple of four [4], the number of transmission/reception phases is $$(1/2) \times (a^2/4) = a^2/8,$$

and when a is not an integer multiple of four [4], the number of transmission/reception phases is $$1/2 \times a \times (a-2)/4 + 1/2 \times (a/2-1) + 1 = a^1 + 4)/8,$$

both of which are equal to the lower limit L1$d$ in the case of using a bi-directional channel when a is an integer multiple of four [4] not less than eight [8].

[Theoretical Lower Limit on Two-Dimensional Torus]

A two-dimensional torus is considered in which the end points at one end of an a×a two-dimensional lattice are connected to the end points at the other end of the same. In the all-to-all communications for the two-dimensional torus, an average message moving distance is a/2 when a is even, the number of processor elements is $a^2$, and the number of communications paths is $2a^2$ for a uni-directional channel or $4a^2$ for a bi-directional channel. Hence, theoretical lower limit L2$s$ of the transmission/reception phases for a uni-directional channel and theoretical lower limit L2$d$ of the transmission/reception phases for a bi-directional channel are as follows:

$$L2s = (a^2 \times a / 2 \times a^2) / 2a^2 = a^3/4.$$

$$L2d = (a^2 \times a / 2 \times a^2) / 4a^2 = a^3/8$$

The algorithm described below will realize this lower limit.

[Algorithm for Realizing Lower Limit on Two-Dimensional Torus]

Figure 6:
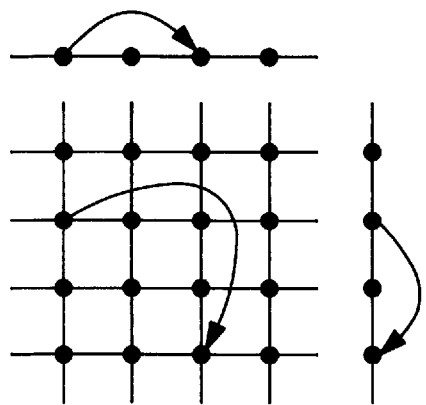
FIG. 6 illustrates an example of cross products for explaining this invention for a two-dimensional torus.
Figure 7:
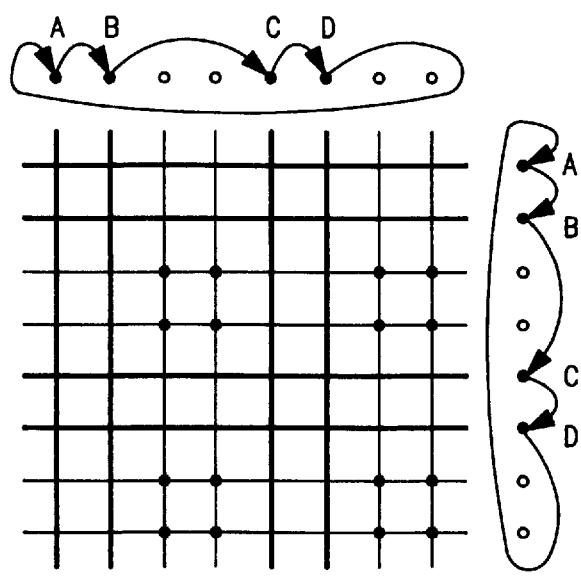
FIG. 7 illustrates an example of superimpositions for determining the communications paths in a two-dimensional torus for explaining this invention.

FIG. 6 illustrates an example of cross products for explaining this invention for a two-dimensional torus. FIG. 7 illustrates an example of superimpositions for determining the communications paths in a two-dimensional torus for explaining this invention.

An all-to-all communications algorithm for a two-dimensional torus is premised on an application to both the horizontal and vertical directions of a two-dimensional torus of the optimal all-to-all communications algorithm for a one-dimensional torus for determining the communications paths by their cross product.

As shown in FIG. 6, the horizontal communications paths are determined based on the algorithm for a one-dimensional torus applied in the horizontal direction, and the vertical communications paths are determined based on the algorithm for a one-dimensional torus applied in the vertical direction. At this time, it is assumed that the horizontal communications paths are determined first.

A simple cross product of horizontal and vertical algorithms produces $(a^2/4)^2 = a^4/16$ as the number of phases necessary for all-to-all communications in the case of a uni-directional channel, which is greater than the theoretical lower limit. However, a fact that only four [4] processor elements are used both in horizontal and vertical directions enables independent plural phases to be superimposed by selecting four [4] processor elements respectively in the horizontal and vertical directions to be selected from among unused processor elements if a is an integer multiple of four [4].

For example, a case is considered in which a phase represented by an expression 1:3:1:3 for a one-dimensional torus is applied to both horizontally and vertically, which is shown in FIG. 7. An expression of communications paths used in this phase represented by bold lines and those unused in this phase represented by thin lines reveals that it is possible to structure an independent phase by using only unused (thin) lines. Since it is possible to superimpose a/4 kinds of phases if a is an integer multiple of four [4], the number of necessary phases in the case of a uni-directional channel is $$a^4/16 + (a/4) = a^3/4$$

which is equal to theoretical lower limit L2$s$.

A similar superimposition is possible for a bi-directional channel. Because eight [8] processor elements are used in the case of a bi-directional channel both in the horizontal and vertical directions, it is possible to superimpose a/8 kinds of phases if a is an integer multiple of eight [8]. Hence, the number of necessary phases in the case of a uni-directional channel is $$(a^2/8)^2 + (a/8) = a^3/8$$

which is equal to theoretical lower limit L2$d$.

As a result, the method shown here represents an optimal algorithm for all-to-all communications for a two-dimensional torus if a is an integer multiple of four [4] when a uni-directional channel is used, or if a is an integer multiple of eight [8] when a bi-directional channel is used.

[Expansion to a Rectangularly Shaped Torus]

Figure 8A:
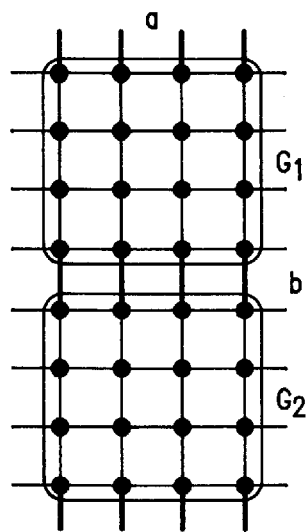
FIG. 8A illustrates a first example of a rectangular shaped two-dimensional torus for explaining this invention.
Figure 8B:
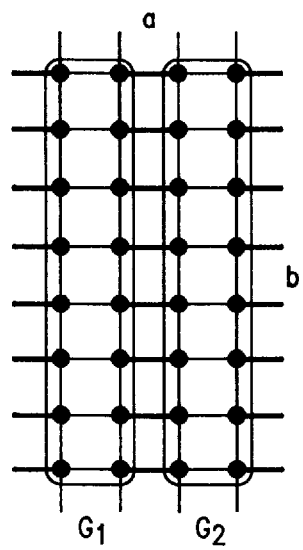
FIG. 8B illustrates a second example of a rectangular shaped two-dimensional torus for explaining this invention.

FIGS. 8A and 8B illustrate examples of a rectangularly shaped two-dimensional torus for explaining this invention.

A two-dimensional torus is not limited to the square-shaped one described earlier, but instead it could also be a rectangularly shaped one, e.g. comprising 128 (8×16) or 512 (16×32) processor elements. It is shown below that the earlier described algorithm can be optimally applied to a rectangularly shaped two-dimensional torus.

]Theoretical Lower Limit on Rectangularly Shaped Two-Dimensional Torus]

Obtained first is a theoretical lower limit of transmission/reception phases in all-to-all communications for a rectangularly shaped two-dimensional torus. A rectangle is assumed to be a×b (where a and b are even), which is split in half into two [2] groups G1 and G2 as shown in FIG. 8A or 8B. When all-to-all communications are performed between two [2] groups G1 and G2, because the total number of messages generated at this time is equal to $2 \times (ab/2)^2$, which pass through communications paths shown as bold lines in FIG. 8A or 8B.

In the case of a bi-directional channel, the number of communications paths represented by bold lines is 4$a$ in the example of FIG. 8B and 4$b$ in the example of FIG. 8B. The communications paths represented by bold lines reveal that because $2 \times (ab/2)^2$ message must pass through these, the case shown as FIG. 8A requires at least $2\times(ab/2)^2+4a=ab^2/8$ phases, and the case shown as FIG. 8A requires at least $2\times(ab/2)^2+4b=a^2b/8$ phases.

Assume here $b \geq a$, then because $ab^2/8 \geq a^2b/8$, all-to all communications for a×b rectangularly shaped two-dimensional torus requires at least $ab^2/8$ phases.

When all-to-all communications are performed between two [2] groups split from processor elements, the number of messages is maximized when the processor elements are split in equal halves. Also, since the number of communications paths connecting two [2] groups is minimized when processor elements are grouped as shown in FIG. 8A, the number of phases $ab^2/8$ shown in FIG. 8A is equal to a theoretical lower limit L'2d for all-to-all communications in a rectangularly shaped two-dimensional torus in the case of using a bi-directional channel. Similarly, $ab^2/4$ is equal to a theoretical lower limit L'2s in the case of using a uni-directional channel.

[Algorithm for Realizing Lower Limit on Rectangularly Shaped Two-Dimensional Torus]

It is described below that an actual application to a rectangle of an optimal algorithm for all-to-all communications in a squarely shaped two-dimensional torus realizes a theoretical lower limit.

As with the case of a squarely shaped two-dimensional torus, communications paths are determined as a cross products obtained by applying the optimal algorithm for a one-dimensional torus in both horizontal and vertical directions. Whether a plurality of independent phases can be superimposed depends on the smaller of a and b. Therefore, since a/8 independent phases can be superimposed when $b \geq a$, if a is an integer multiple of eight [8], the number of necessary phases is $$(a^2/8) \times (b^2/8) + (a/8) = ab^2/8$$

which is equal to theoretical lower limit L'2d.

Similarly in the case of a uni-directional channel, if a is an integer multiple of four [4], the number of necessary phases is $$(a^2/4) \times (b^2/4) + (a/4) = ab^2/4$$

which is equal to theoretical lower limit L'2s.

Next explained is a higher-dimensional torus of three-dimensions or more.

[Theoretical Lower Limit on Three-Dimensional Torus]

The above discussions are applicable to a higher-dimensional torus.

Similarly to the two-dimensional case, theoretical lower limits L'3s (in the case of uni-directional channel) and L'3d (in the case of bi-directional channel) on the transmission/reception phases in all-to-all communications for a three-dimensional torus of an a×b×c rectangular parallelepiped (where $c \geq b \geq a$) are as follows:

$$L'3s=abc^2/4$$

$$L'3d=abc^2/8$$

The same algorithm as the one used for a two-dimensional torus will realize these lower limits.

[Algorithm for Realizing Lower Limit on Three-Dimensional Torus]

An all-to-all communications algorithm for a three-dimensional torus is premised on an application to the x, y and z directions of a three-dimensional torus of the optimal all-to-all communications algorithm for a one-dimensional torus for determining the communications paths by their cross product. In the case of a bi-directional channel, it is possible to superimpose a/8 independent phases for an a×b two-dimensional torus if a is an integer multiple of eight [8], and it is possible to superimpose b/8 independent phases for ab×c two-dimensional torus if b is an integer multiple of eight [8]. Hence, the number of necessary phases, when both a and b are integer multiples of eight [8], is $$(a^2/8) \times (b^2/8) \times (c^2/8) + (a/8) + (b/8) = abc^2/8$$

which is equal to theoretical lower limit L'3d, which proves the algorithm to be optimal.

Similarly, in the case of a uni-directional channel, when both a and b are integer multiples of four [4], the number of necessary phases is $abc^2/4$, which matches theoretical lower limit L'3s.

[Theoretical Lower Limit on Generic Torus]

Generally, theoretical lower limits L'ns (in the case of uni-directional channels) and L'nd (in the case of bi-directional channels) on the transmission/reception phases in all-to-all communications for an n-dimensional torus of an a1×a2×...×an rectangular parallelopiped (where $an \geq an-1 \geq ... \geq a1$) are as follows:

$$L'nd=an\times(a1\times a2\times ... \times an)/8=anP/8$$

$$L'ns=anP/4$$

where P is the number of processor elements.

Meanwhile, it is known that the number of phases necessary for an algorithm, which is a combination of n optimal algorithms for one-dimensional torus, for determining a communications paths as their-cross-products and for superimposing independent phases, is an P/8, when a1, a2, ..., an−1 are integer multiples of eight [8], which matches L'nd, thereby proving the optimal algorithm.

In the case of a uni-directional channel as well, because an P/4=L'ns, when a1, a2, ... an−1 are integer multiples of four [4], the algorithm proves to be optimal.

Especially, if a1=a2= ... an=a, when a is an integer multiple of eight [8], theoretical lower limit Lnd for all-to-all communications in the case of using a bi-directional channel for an n-dimensional torus is expressed as $Lnd=P^{(n+1)/n}/8$.

Similarly, when a is an integer multiple of eight [8], theoretical lower limit Lns for all-to-all communications in the case of using a uni-directional channel for an n-dimensional torus is expressed as $Lns=P^{(n+1)/n}/4$.

The present invention previously prepares the minimum number of transmission/reception phases which is theoretically determined as described above and enables respective processors to perform message communications in respective phases, thereby achieving optimal all-to-all communications.

A more concrete embodiment is explained next.

[Configuration of Processor Elements]

Figure 9:
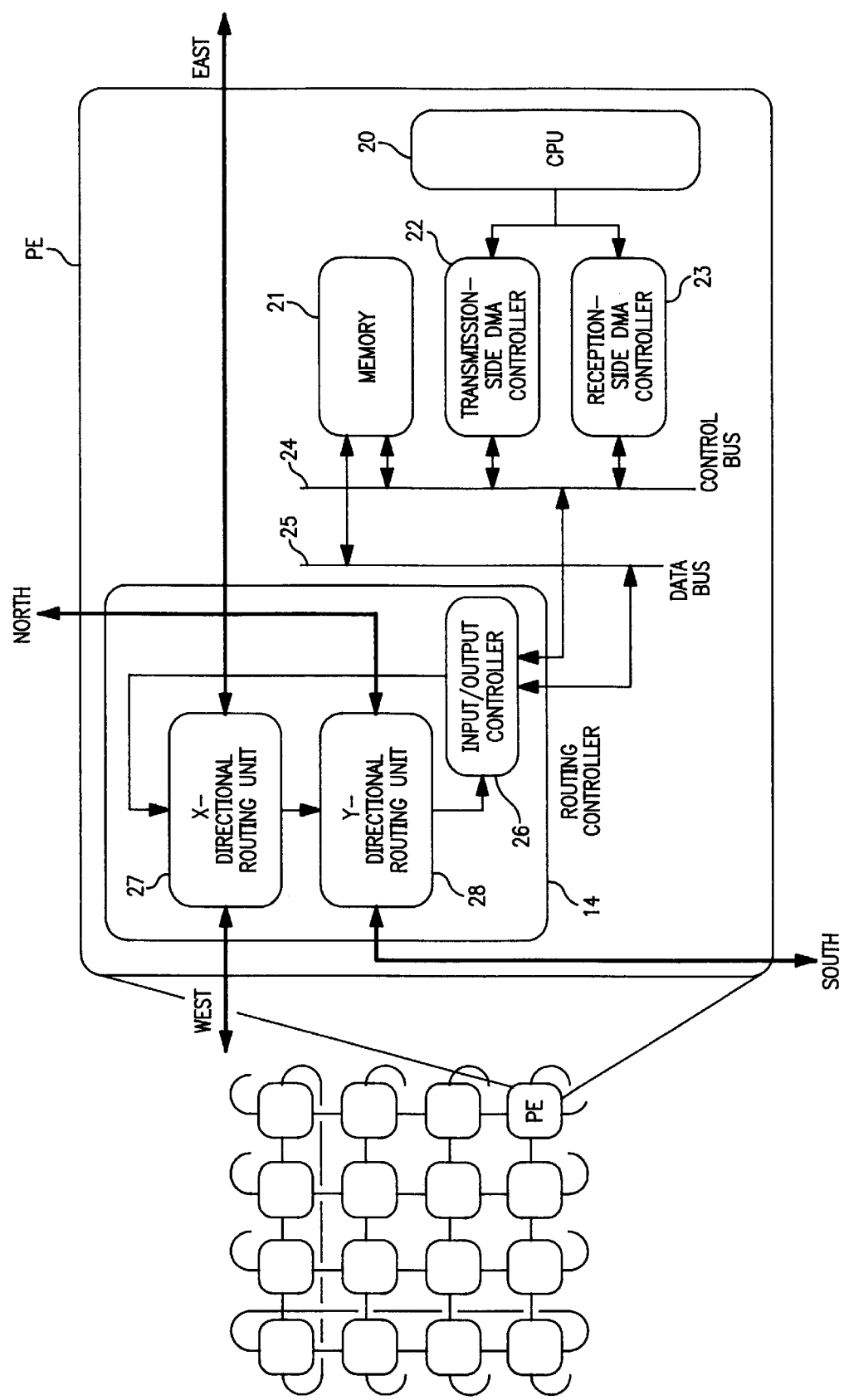
FIG. 9 illustrates an exemplary configuration of processor elements for use in a parallel computer related to an embodiment of this invention.

FIG. 9 illustrates an example configuration of processor elements for use in a parallel computer related to an embodiment of this invention.

The hardware of a parallel computer of this invention does not differ from a conventional parallel computer having a torus network. In FIG. 9, 20 is a central processing unit (CPU), 21 is a memory for storing data and commands, 22 is a transmission-side DMA controller for data transmission, 23 is a reception-side DMA controller for data reception, 24 is a control bus, 25 is a data bus, 26 is an input/output controller for the routing controller 14, 27 is an X-directional routing circuit for data transfer control by wormhole routing or a channel connection on the east-west (right-left) direction, and 28 is a Y-directional routing circuit for data transfer control by wormhole routing or a channel connection on the south-north (down-up) direction. The contents of the phase control means 11, the phase control table 12, and the message transmission/reception means 13 shown in FIG. 2 are stored in the memory 21, and managed by the CPU 20.

The parallel computer shown in FIG. 9 comprises a two-dimensional torus network, in which all processor elements PEs have the same configuration. The routing controller 14 comprises an LSI of a single chip, for example, and has a routing control function by a wormhole routing or a channel connection system. Since various arts for such routing controls are known but they are not essential to the description of this invention, their detailed explanation is skipped here.

On transmitting message data to another processor element, the CPU 20 assigns a transmission command and an address at which a message stored in the memory 21 to be transmitted and activates the transmission-side DMA controller 22. The transmission-side DMA controller 22 reads the message from the memory 21 and transfers it in a DMA mode to the routing controller 14 message data with the designated header attached. This causes the input/output controller 26 in the routing controller 14 to control a message data transmission to the reception-side processor element. On the other hand, on receiving message data, the reception-side DMA controller 23 has the memory 21 store message data for the home processor element according to the interrupt by the input/output controller 26 of the routing controller 14. At this time, the address in the memory 21 at which the message is stored is assumed to have been informed by the CPU 20.

When all-to-all communications are executed, by referring to the phase control table 12 (shown in FIG. 2) provided in the memory 21, application programs run by the CPU 20 transmit message data to the reception-side processor element in the phase via the transmission-side DMA controller 22 for each phase. A program for realizing the message transmission means 13 shown in FIG. 2 can be put into a library beforehand for an easy incorporation into various application programs upon their creations.

[Exemplary Phase of One-Dimensional Torus for Uni-Directional Channel]

Figure 10A:
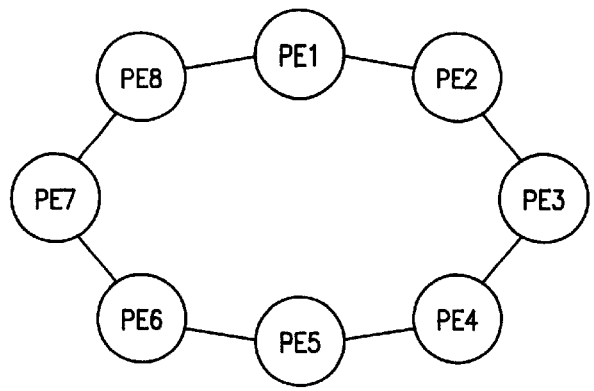
FIG. 10A shows a block diagram of a one-dimensional torus network.
Figure 10B:
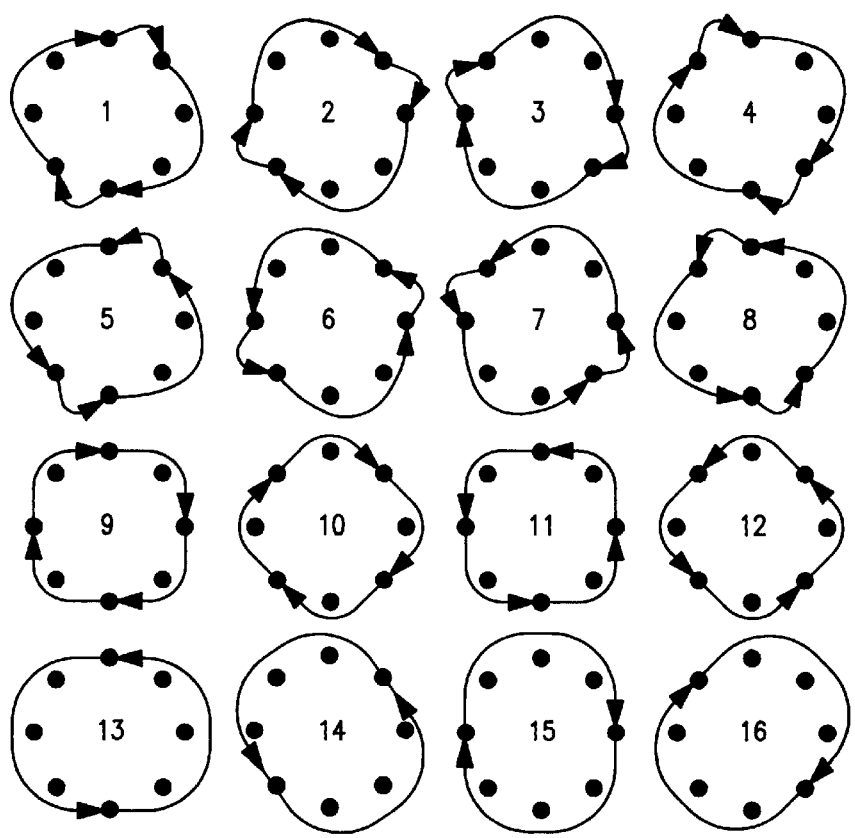
FIG. 10B illustrates an exemplary phase of a one-dimensional torus (in the case of a uni-directional channel) in an embodiment of this invention.
Figures 11A, 11B:
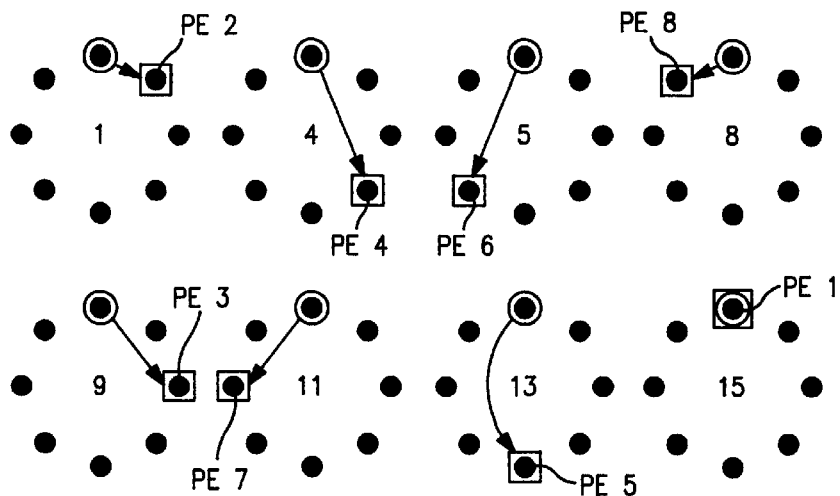
FIG. 11A illustrates an example of a phase control table for use in explaining an embodiment of this invention.
FIG. 11B shows the phase in which processor element PE1 transmits message data.

FIGS. 10A and 10B illustrate example phases of a one-dimensional torus (in the case of a uni-directional channel) in an embodiment of this invention. FIGS. 11A and 11B illustrate examples of phase control tables for use in explaining an embodiment of this invention.

Explained below is an example of transmission/reception phases optimal for all-to-all communications for a parallel computer having a one-dimensional torus network, such as one shown in FIG. 10A. Assume here that a connection channel is uni-directional, that an interface between a processor element and the network has one [1] port, and that the number of processor elements is eight [8].

As explained earlier, the lower limit on the number of phases for a one-dimensional torus (in the case of a uni-directional channel) is $a^2/4$, and sixteen [16] phases form the minimum, when a=8. When, in respective phases, the eight [8] processor elements are split into two [2] groups and the phase forming a four-point cycle is obtained by the earlier described algorithm, sixteen [16] phases shown in FIG. 10B are obtained, for instance. Here, eight [8] black dots shown in FIG. 10B correspond respectively to processor elements PE1 through PE8 shown in FIG. 10A.

The phase control table 12 e.g. shown in FIG. 11A is created for expressing respective phases shown in FIG. 10B. The phase control table 12 is configured to such that respective processor elements have data on the reception-side processor element to which respective processor elements transmits message data. Here, the phase control table 12 can be created as what is common to all processor elements or as what stores only data related to the home processor element for each processor element. The format is not limited to that shown in FIG. 11A, but can be of one for controlling data having correspondence by pairing a transmission-side processor element and a reception-side processor element.

The data of the phase control table 12 shown in FIG. 11A correspond to phase 1 through phases 16 shown in FIG. 10B, such that, in phase 1, processor elements PE1, PE2, PE5 and PE6 transmit concurrently message data respectively to PE2, PE5, PE6 and PE1. Processor elements PE3, PE4, PE7 and PE8 do not transmit message data in phase 1.

Next, in phase 2, processor elements PE2, PE3, PE6 and PE7 transmit concurrently message data respectively to PE3, PE6, PE7 and PE2. Processor elements PE1, PE4, PE5 and PE8 do not transmit message data in phase 2.

FIG. 10B reveals, all of phases shown in FIG. 10B, the phase in which processor element PE1 transmits message data. It is assumed here that processor element PE1 may transmit message data to itself, which is expressed by phase 15.

Processor element PE1 transmits message data to processor elements PE2 in phase 1, to processor elements PE4 in phase 4, to processor elements PE6 in phase 5, to processor elements PE8 in phase 8, to processor elements PE3 in phase 9, to processor elements PE7 in phase 11 and to processor elements PE5 in phase 13, thus terminating message transmissions to other processor elements. As shown in FIG. 11A, PE5 in addition to PE1 in phase 15, and PE2 and PE6 in phase 16 transmit messages to themselves A reception is similar to the above. In sixteen [16] phases shown in FIG. 10B, the reception of message data from all processor elements is consummated. Other processor elements perform similarly, such that all-to-all communications consummate within sixteen [16] phases.

[Exemplary Phase of One-Dimensional Torus for Bi-Directional Channel]

In the case of a bi-directional channel, the number of phases can be slashed to a half by superimposing mutually independent two [2] four-point cycles having different communications directions in the phase of a uni-directional channel. Here, being independent should be construed as meaning that no single processor element in the two [2] four-point cycles both receives and transmits message data.

More specifically, in the case of a bi-directional channel, the number of phases can be slashed to a half by superimposing the following phases in the case of a uni-directional channel shown in part FIG. 10B.

(1) Phase 1 and phase 7
(2) Phase 2 and phase 8
(3) Phase 3 and phase 5
(4) Phase 4 and phase 6
(5) Phase 9 and phase 12
(6) Phase 10 and phase 11
(7) Phase 13 and phase 15

(8) Phase 14 and phase 16

Although this is not drawn, by making the above (1) through (8) thus superimposed eight [8] phases in the case of a bi-directional channel, it becomes possible to consummate all-to-all communications in $a^2/8=8$, which is the lower limit number of phases for a one-dimensional torus (in the case of a uni-directional channel).

[Exemplary Phase of Two-Dimensional Torus for Uni-Directional Channel]

In the case of a torus of two [2] or more dimensions, an optimal phase of the theoretical lower limit can be determined similarly by determining the communications path through a superimposition of the communications method for a one-dimensional torus. FIGS. 12A–12D illustrate examples of a two-dimensional torus for use in explaining an embodiment of this invention.

In the case of a one-dimensional torus, only when a bi-directional channel is used, one [1] phase can be configured by superimposing two [2] four-point cycles. Yet, in the case of a two-dimensional torus, even when a uni-dimensional channel is used, a plurality of four-point cycles can be superimposed.

For instance, in all-to-all communications by 8×8 two-dimensional torus, because sixteen [16] phases are necessary for all-to-all communications in a one-dimensional torus comprising eight [8] processor elements, a simple cross product between the horizontal direction and the vertical direction produces two hundred and fifty-six [256] phases.

Figure 12A:
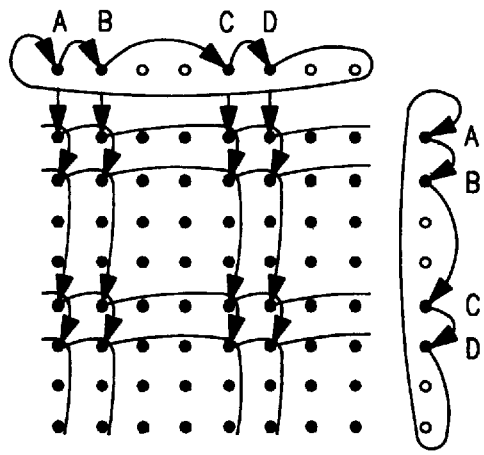
FIG. 12A illustrates a first example of a two-dimensional torus for use in explaining an embodiment of this invention.
Figure 12B:
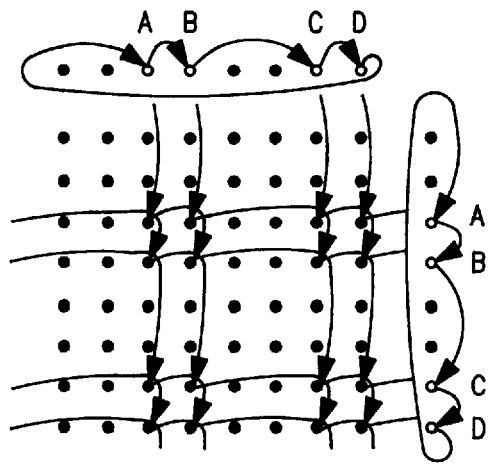
FIG. 12B illustrates a second example of a two-dimensional torus for use in explaining an embodiment of this invention.
Figure 12C:
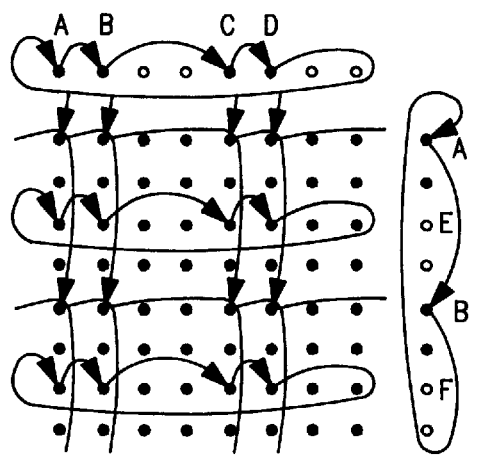
FIG. 12C illustrates a third example of a two-dimensional torus for use in explaining an embodiment of this invention.
Figure 12D:
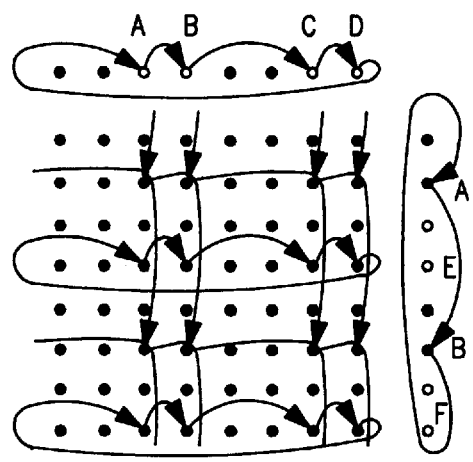
FIG. 12D illustrates a fourth example of a two dimensional torus for use in explaining an embodiment of this invention.

FIGS. 12A–12D express phases having communications paths of four-point cycle in the horizontal direction and the vertical direction, respectively. Although the example shown in FIGS. 12C and 12D illustrate two-point cycles in the vertical direction, considering that points E and F transmit message data to themselves, the fact remains that four points are used.

As is evident from the example shown in FIGS. 12A–12D, because FIGS. 12A and 12B do not have a duplication in a transmission-side or reception-side processor element or a communications path, they can be superimposed. Also, FIGS. 12C and 12D can be superimposed.

In this manner, since the two hundred and fifty-six [256] phases generated as a simple cross product between the horizontal direction and the vertical direction can be superimposed in pairs of two [2] phases, they can be reconfigured into a half of that number, which is one hundred and twenty-eight [128] phases. All-to-all communications can be consummated by these one hundred and twenty-eight [128] phases thus determined, which matches the theoretical lower limit.

In the case of a bi-directional channel, when a torus having a higher dimension is used, by similarly expending this method, a phase for realizing optimal all-to-all communications can be determined.

[Flowchart of Embodiment]

Figure 13:
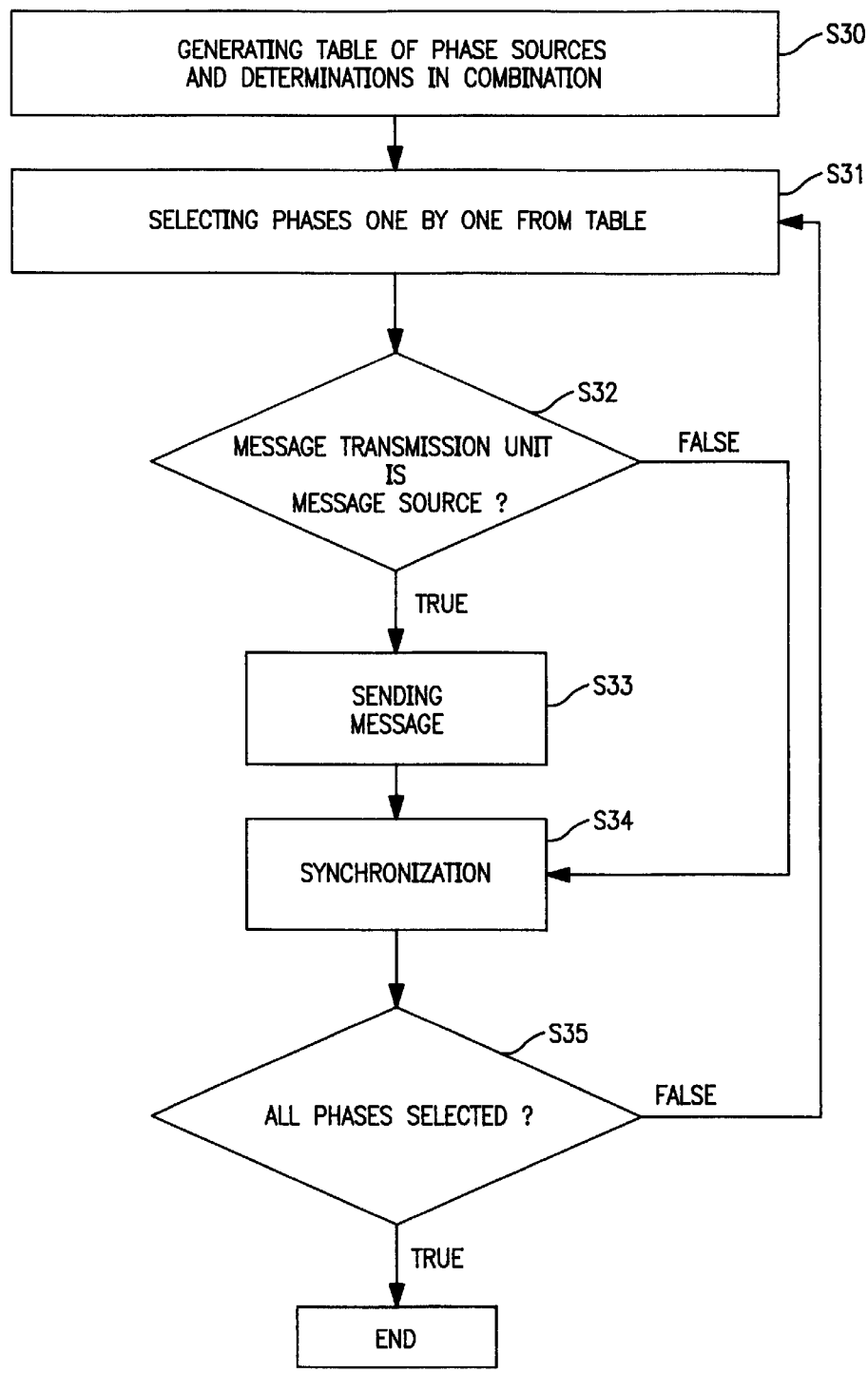
FIG. 13 is a flowchart of an embodiment of this invention.

FIG. 13 is a flowchart of an embodiment of the entire process of this invention.

Steps S30 through S35 in FIG. 13, for example, expresses the entire process flow of this invention.

In S30, a table (the phase control table 12) expressing the combinations between the message originating processor elements and the message terminating processor elements in respective phases whose number is equal to the theoretical lower limit, according to the structure of a torus network is created by the host computer 10 and the phase control means 11 shown in FIG. 2.

In S31, a phase is selected by the phased control means 11 sequentially from the phase control table 12 in performing all-to-all communications.

In S32, the message transmission means 13 determines whether or not a home processor element is a message originating processor element according to the contents of the phase control table 12. If it is not a message originating processor element, skip the transmission in the current phase.

In response to this, in S32, if it is a message originating processor element, attach data on the message terminating processor element in the current phase to the header of message data and transmit the message data.

In S34, a synchronization of processor elements is maintained until respective processor elements consummate message transmissions and the next phase can be instituted. The synchronization is realized actually by a specific hardware, or the CPU 20, the transmission-side DMA 22, the reception-side DMA 23, and the routing controller 14 shown in FIG. 9.

In S35, the phase control means 11 determines whether or not all phases have been selected completely. If they are completely selected, consummate all-to-all communications. If an unprocessed phase remains, loop back to S31 for processing the next phase similarly.

Figure 14:
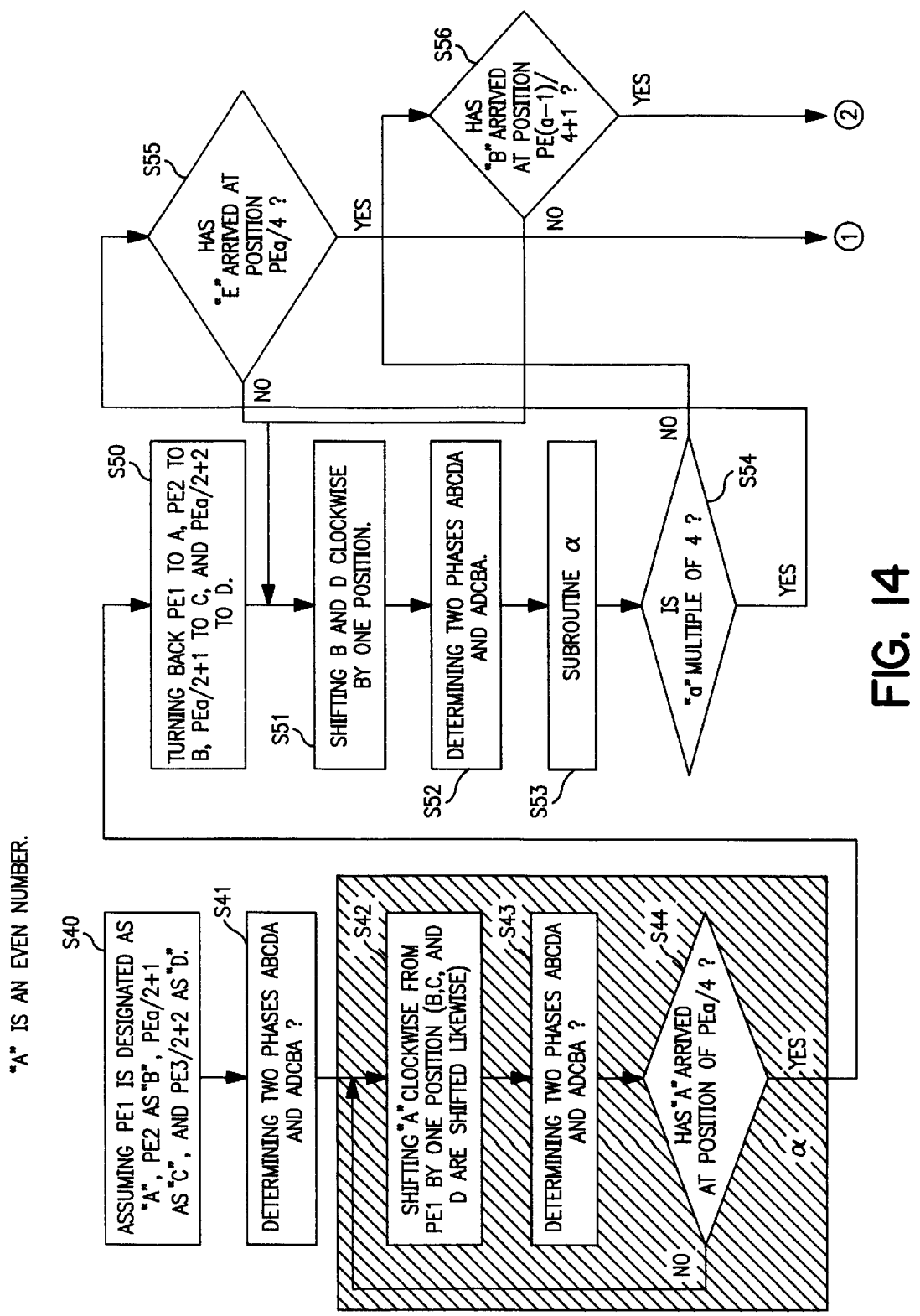
FIG. 14 is a flowchart (1) for explaining an embodiment of generating a phase control table.
Figure 15:
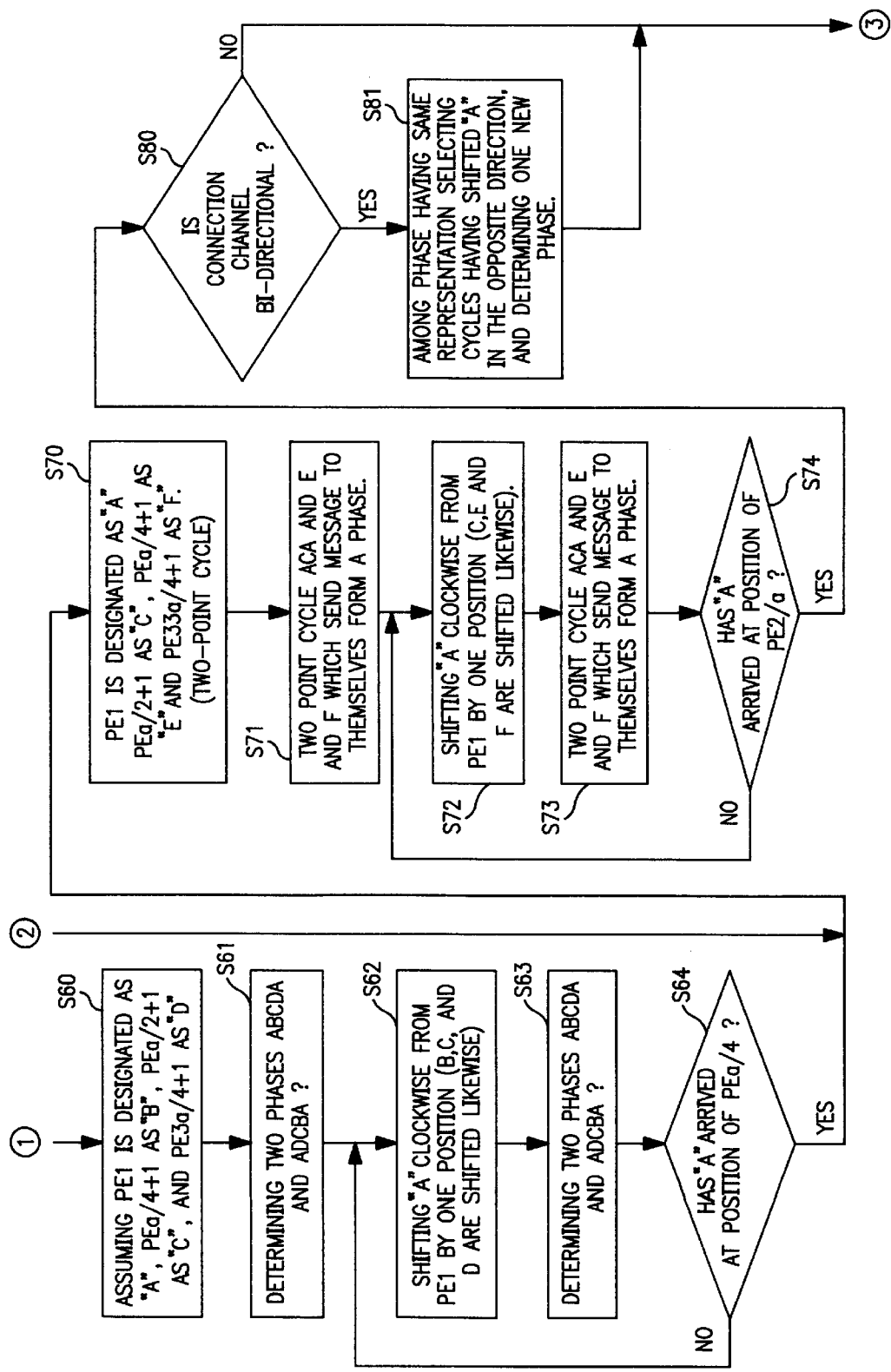
FIG. 15 is a flowchart (2) for explaining an embodiment of generating a phase control table.
Figure 16:
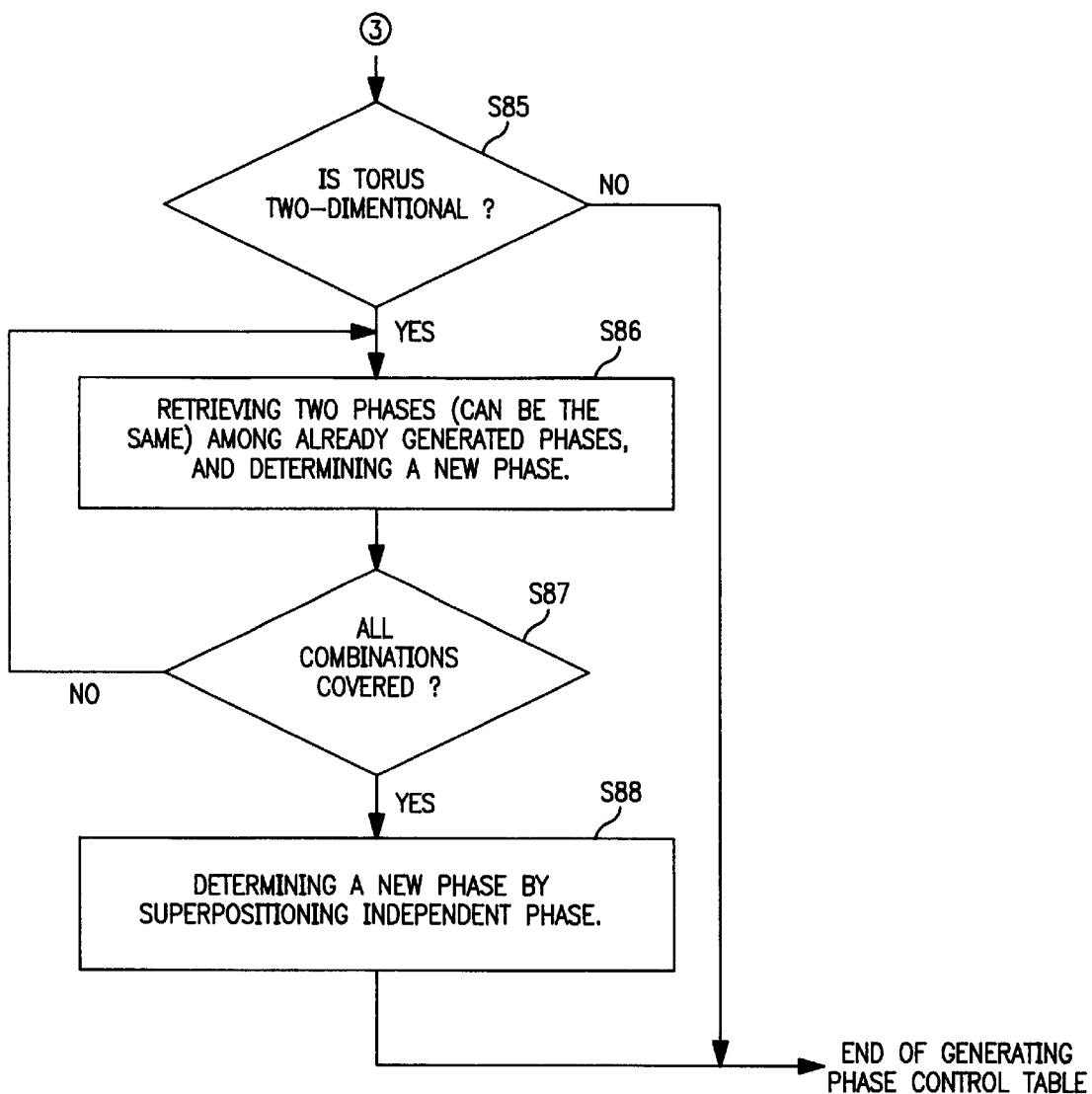
FIG. 16 is a flowchart (3) for explaining an embodiment of generating a phase control table.

FIGS. 14–16 are flowcharts of the embodiments of the phase control table generating process. These figures show in detail the process in S30 shown in FIG. 13. Here, an embodiment of the phase control table generating process is explained assuming that the number of processor elements a is an even number, and the torus network is one- or two-dimensional.

In S40 through S44 shown in FIG. 14, among the phases operating as uni-directional cycles connecting four processor elements A, B, C, and D as described in [Algorithm For Realizing Lower Limit On One-dimensional Torus], two phases are determined in opposite directions to each other assuming that PE1 in group $G_1$ is designated as "A", its adjacent processor element PE2 as "B", a processor element in group $G_2$ separate from A by a/2 positions as "C", and a processor element separate from B by a/2 positions as "D".

First, in S40, processor elements A, B, C, and D are designated as described above. In S41, two phases are determined for four-point cycles ABCDA and ADCBA. Then, in S42, the position of processor element A is shifted clockwise from PE1 by one position. Likewise, the positions of B, C, and D are shifted. In S43, after the shift, two phases are determined for ABCDA and ADCBA. In S44, it is determined whether or not the position of processor element A has reached the last processor element PEa/2 in group $G_1$. If not, the processes in and following S42 are repeated. Since the processes in S42 through S44 are repeated in S53 as described later, they are collectively referred to as subroutine α.

If it is determined that the position of processor element A has reached the last position in group $G_1$ in S44, then a process of obtaining a four-point cycle in which the relative positions of processor elements A and B are different from those in S40 through S44, that is, processor elements A and B are not adjacent to each other, is performed in S50 through S56. That is, in S50, after processor elements A, B, C, and D are returned to the positions in S40, the positions of B and D are shifted clockwise by one position in S51, two phases for the two cycles ABCDA and ADCBA are determined in S52, the process of subroutine α is performed in S53 until processor element A arrives at the position of the last processor in group $G_1$, and when it arrives at the position of the last processor PEa/2, then it is determined whether or not the number of processor elements a is a multiple of 4.

If a is a multiple of 4, then it is determined whether or not processor B has arrived at the position of PEa/4 in S55 as described in (1) [Algorithm For Realizing Lower Limit On One-dimensional Torus]. If not, the processes in and following S51 are repeated. By contrast, if a is not a multiple of 4 in S54, then it is determined in S56 whether or not processor element B has arrived at the position of PE (a−2)/4+1 as described in (2) of the above mentioned algorithm. If not, the processes in and following S51 are repeated.

If it is determined that processor B has arrived at the position of PEa/4 in S55, a phase in which each processor is positioned apart by a/4 positions from each other is determined in S60 through S64 shown in FIG. 15 as described in (3) of the algorithm mentioned above. That is, a process is performed in S60 assuming that processor element A is designated as "PE1", a processor element separate from PE1 by a/4 positions as "B", a processor element separate from PE1 by a/2 positions as "C", and a processor element separate from PE1 by 3a/4+1 positions as "D". Two phases for two four-point cycles ABCDA and ADCBA are determined in S61, the position of A is shifted in S62 as in S42, two phases are determined for the shifted positions in S63, and it is determined whether or not processor element A has arrived at the position of PEa/4 in S64. If not, the processes in and following S62 are repeated.

If it is determined in S56 shown in FIG. 14 that processor element B has arrived at the position of (a−2)/4+1 or if it is determined in S64 shown in FIG. 15 that processor element A has arrived at the position of a/4, then a phase for two-point cycle described in (4) of the algorithm mentioned above is determined in S70 through S74. That is, in S70, a process is performed assuming that processor element A is designated as PE1, a processor element separate from A by a/2 positions as "C", a processor element separate from A by a/4 positions as "E", and a processor element separate from A by 3a/4 positions as "F". In S71, a two-point cycle ACA and processor elements E and F form a phase in which these processor elements send messages to themselves. In S72, A is shifted clockwise from PE1 by one, and likewise, processor elements C, E, and F are shifted. In S73, as in S71, a two-point cycle and a transmission cycle in which a message is transmitted to a sending processor element itself form one phase. In S74, it is determined whether or not processor element A has arrived at the position of a/2. If not, the processes in and following S72 are repeated.

If it is determined that processor element has arrived at the position of a/2, then the process for a uni-directional connection channel is actually terminated. Then, in S80 it is determined whether or not the connection channel is bi-directional. If yes, cycles in which the positions of processor element A are different by the shift, can be superimposed to each other, and operate in the opposite direction to each other are selected as a new phase in S81. Thus, the number of phases can be reduced.

When the connection channel is not bi-directional in S80, or after all processes of superimposing phases are completed in 81, it is determined in S85 shown in FIG. 16 whether or not the torus is two-dimensional. If not, that is, if it is a one-dimensional torus, then the process of generating a phase control table is completed.

If it is determined in S85 that the torus is two-dimensional, then two phases are retrieved from the phases generated for the one-dimensional torus, and a new phase is determined by a cross-product. In S87, it is determined whether or not all combinations are covered. If not, the processes in and after S86 are repeated. If yes, a new phase is determined by superimposing a plurality of mutually independent phases in S88. After the process, the phase control table generating process is completed.

A realization of the above procedures for all-to-all communications as a software piece in a library format for common uses by all application programs and its incorporation in an application program easily enable optimal all-to-all communications to be accomplished.

The combination table expression the pairs between the message originating processor elements and the message terminating processor elements of a phase in the case of a one-dimensional torus can be created in advance, or dynamically created when an application program is run. The latter is more effective when the number of processor elements are not fixed.

The method for synchronizing after transmission in S34 shown in FIG. 13 are as follows. If a parallel computer has hardware for synchronization as described above, utilize it. If not, calculate the duration necessary for transmission e.g. from the size of data to be transmitted and the transmission rate over the communications path, wait for the duration, and then phase in the next operation, thereby realizing the synchronization of the end of respective phases.

As described above, this invention enables a parallel computer having a torus network to realize optimal all-to-all communications. As a result, the execution of an application program using all-to-all communications is expedited, thereby realizing an efficient use of a parallel computer.

The present invention can be utilized in all fields in industry where processes performed by parallel computers, and more specifically processes requiring all-to-all communications among processors are utilized.

What is claimed is:

1. A parallel computer having a n-dimensional torus network comprising $a_1 \times a_2 \times \ldots \times a_n$ processors forming a greater than 4×4 network which performs all-to-all communications among the processors through the torus network, each processor comprising:

a phase control device having a phase control table including data indicating destination processors for a number of transmission phases, the number of transmission phases determined based on a structure of the torus network and a number of processors, each transmission phase describing a different communication path between said processors, the phase control table being prepared in advance and registering data indicating the destination processor for each of the transmission phases and being set in the phase control device of each processor;

message sending means for sending a message to one of the destination processors designated by the data stored in the phase control table, said transmission phases being determined by grouping the processors into a first and second group, each group including a neighboring $a_n/2$ processors of $a_n$ processors such that an end processor in the first group is a first processor, a second processor is selected from among the remaining processors in the first group, and a third and a fourth processor are selected from the second group and are separated apart by $a_n/2$ from the first and second processors, thereby transmitting the message via said communication paths as a four point cycle determined by said transmission phases; and wherein during a communications process, each of said processors forming said n-dimensional torus network selects phases one by one from said phase control table in said phase control device contained in that processor, if a processor is a current source processor, the message is sent to a destination processor corresponding to said selected phase, and then said processors are synchronized until control is transferred to the next phase, and each said processor determines whether all phases in said phase control table have been selected, if said processor determines that all phases have not been selected, the process of and those after selecting phases one by one from said phase control table are repeated, and if said processor determines that all phases have been selected, the entire process terminates.

2. A parallel computer having a n-dimensional torus network comprising $a_1 \times a_2 \times \ldots \times a_n$ processors forming a greater than 4×4 network which performs all-to-all communications among the processors through the torus network, each processors comprising:

a phase control device having a phase control table including data indicating destination processors for a number of transmission phases, the number of transmission phases determined based on a structure of the torus network and a number of processors, each transmission phase describing a different communication path between said processors, the phase control table being prepared in advance and registering data indicating the destination processor for each of the transmission phases and being set in the phase control device of each processor;

message sending means for sending a message to one of the destination processors designated by the data stored in the phase control table, said transmission phases being determined by grouping the processors into a first and second group, each group including a neighboring $a_n/2$ processors of $a_n$ processors such that an end processor in the first group is a first processor, a second processor is selected from among the remaining processors in the first group, and a third and a fourth processor are selected from the second group and are separated apart by $a_n/2$ from the first and second processors, thereby transmitting the message via said communication paths as a four point cycle determined by said transmission phases; and wherein, in generating said phase control table for storing data indicating said destination processors for said number of transmission phases depending on the structure of said torus network and the number of said processors, if the number of processors "m" is an even number, then a first processor element (PE) in a one-dimensional torus network is designated as processor A, a second PE as processor B, a (m/2+1)th PE as processor C, and a (m/2+2)th PE as processor D, two phases for inter-processor path ABCDA and path ADCBA in opposite directions to each other are determined, said processor A is shifted clockwise by one from said first PE, and likewise, processors B, C, and D are shifted together, two phases for inter-processor path ABCDA and path ADCBA in opposite directions to each other are determined, it is determined whether processor A has arrived at the position of the m/2th PE, if it is determined that processor A has not arrived, a process for repeating the processes from where processor A is shifted from said first PE, and likewise, processors B, C, and D are shifted together, are repeated, if it is determined that processor A has arrived, the first processor is returned to the position of processor A, the second PE to processor B, the (m/2+1)th PE to processor C, and the (m/2+2)th PE to processor D, processors B and D are shifted clockwise by one, two phases for path ABCDA and path ADCBA in opposite directions to each other are determined, a subroutine α is executed, it is determined whether the number of processors m is a multiple of 4, if it is determined that the number of processors is a multiple of 4, it is determined whether processor B has arrived at the position of the m/4th PE, if it is determined that processor B has not arrived, the processes from where said processors B and D are shifted clockwise by one are repeated, if it is determined that processor B has arrived, the first processor is designated as processor A, the (m/4+1)th PE as processor B, the (m/2+1)th PE as processor C, and the (3m/4+1)th PE as processor D, two phases for path ABCDA and path ADCBA in opposite directions to each other are determined, processor A is shifted clockwise by one from said first PE, and likewise, processors B, C, and D are shifted together, two phases for path ABCDA and path ADCBA in opposite directions to each other are determined, it is determined whether processor A has arrived at the position of the m/4th PE, if processor A has not arrived, the processes from where processor A is shifted, and likewise, processors B, C, and D are shifted together, are repeated, if the number of said processors is determined not to be a multiple of 4, then it is determined whether or not processor B has arrived at the position of the ((m−2)/4+1)th PE, if processor B has not arrived, the processes from where said processors B and D are shifted counterclockwise by one are repeated, if processor B is determined to have arrived at the position of the ((m−2)/4+1)th PE, or if processor A is determined to have arrived at the position of the m/4th PE, then the first PE is designated as processor A, the (m/2+1)th PE as C, the (m/4+1)th PE as E, and the (3m/4+1)th processor as F, the two-point cycle of path ACA and one phase in which processors E and F send messages to themselves are determined, processor A is shifted clockwise by one from said first PE, and likewise, processors C, E, and F are shifted together, the two-point cycle of path ACA and one phase in which processors E and F send messages to themselves are determined, it is determined whether processor A has arrived at the position of the m/2th PE, if processor A has not arrived, the processes from where processor A is shifted, and likewise, processors C, E, and F are shifted together, are repeated, if processor A has arrived, it is determined whether the connection channel is two-directional, if the connection channel is not two directional, then no actions are taken, if the connection channel is two-directional, a cycle is selected from phases in the same representation in which processor A is shifted to form another cycle operating in the direction opposite to the original phase, thus generating a new phase, it is determined whether the dimension of said torus network is two-dimensional, if the dimension is not two-dimensional, that is, if it is one-dimensional, then the phase control table generating process terminates, if the dimension is two-dimensional, then two phases are retrieved from the already generated phases to determine one new phase through a cross-product method, it is determined whether all combinations are determined for the already generated phases, if all combinations are not determined, the processes in which two phases are retrieved from the already generated phases to determine one new phase through a cross-product method are repeated, when all combinations are determined, a plurality of independent phases are superimposed to determine one new phase, and thus the phase control table generating process terminates.

3. The parallel computer according to claim 1, or 2, further comprising:

a host computer for generating the data of said phase control table indicating said destination processors for each of said transmission phases depending on the structure of said torus network and the number of said processors.

4. The parallel computer according to claim 1 or 2, wherein each of said processors forming part of said n-dimensional torus network further comprises:

sending DMA control means for controlling a sending of messages to other said processors, receiving DMA control means for controlling a receiving of messages from other said processors, routing control means for controlling a routing of messages in said torus network, and central processing means for controlling an operation of all said processors.

5. An all-to-all communications method using a parallel computer having an n-dimensional torus network comprising $a_1 \times a_2 \times \ldots a_n$ processors forming greater than a 4×4 network, comprising the steps of:

sequentially operating predetermined $a_{max}$ P/4 transmission and reception phases, where an inter-processor connection channel is one-directional, a maximum value of $a_1, a_2, \ldots, a_n$ determined depending on a structure of a torus network is defined as $a_{max}$, and a total number of processors is P, each transmission and reception phase describing different communication paths between said processors;

enabling each processor to send a message to a destination processor which is predetermined in each of said sequentially operated transmission and reception phases;

providing phase control table registering data indicating the destination processor for each processor as a source processor for each of the transmission and reception phases determined by grouping the processors into a first and second group each group including a neighboring $a_{max}/2$ processors of $a_{max}$ processors such that an end processor in the first group is a first processor, a second processor is selected from the remaining processors in the first group, and a third and a fourth processor are selected from the second group and are separated apart by $a_{max}/2$ from the first and second processors;

performing all-to-all communications using said phase control table;

when said communications path is determined between a source processor and a destination processor in each phase, dividing $a_1$ processors in a torus in an n-dimensional torus network into two adjacent groups each comprising $a_1/2$ processors;

designating a processor at the end of a first of said two adjacent groups as a first processor;

selecting a second processor from the remaining processors in the first group;

selecting processors separate from said first and second processors by $a_1/2$ as a third and a fourth processor in a second of said two adjacent groups; and forming said first, second, third, and fourth processors in a four-point cycle communications path.

6. The all-to-all communications method using a parallel computer according to claim 5, further comprising the steps of:

when a dimension of a torus network indicates a value more than 1, determining said communications path in each of said phases by combining the communications paths each being in a phase where each dimension of a torus network is one-dimensional; and using $a_{max}$ P/4 phases by superimposing said phases having a plurality of mutually independent communications.

7. The all-to-all communications method using a parallel computer according to claim 5, further comprising the steps of:

when the dimension of a torus network indicates a value more than 1, determining the communications path in each phase; and using $a_{max}$ P/4 phases by superimposing phases having a plurality of mutually independent communications.

* * * * *